(12) United States Patent
Schmitt et al.

(10) Patent No.: US 9,468,974 B2
(45) Date of Patent: Oct. 18, 2016

(54) PLAIN BEARING MATERIAL

(75) Inventors: Holger Schmitt, Pfungstadt (DE);
Thomas Enghof, Wiesbaden (DE);
Daniel Meister, Mainz-Kastel (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 162 days.

(21) Appl. No.: 13/318,521

(22) PCT Filed: May 5, 2010

(86) PCT No.: PCT/EP2010/056088
§ 371 (c)(1),
(2), (4) Date: Feb. 21, 2012

(87) PCT Pub. No.: WO2010/128076
PCT Pub. Date: Nov. 11, 2010

(65) Prior Publication Data
US 2012/0141057 A1 Jun. 7, 2012

(30) Foreign Application Priority Data
May 7, 2009 (DE) .......... 10 2009 002 894

(51) Int. Cl.
| C22C 9/00 | (2006.01) |
| F16C 33/06 | (2006.01) |
| B32B 15/01 | (2006.01) |
| C22C 32/00 | (2006.01) |
| B22F 7/08 | (2006.01) |
| C22C 1/04 | (2006.01) |
| F16C 33/12 | (2006.01) |

(52) U.S. Cl.
CPC ............... *B22F 7/08* (2013.01); *B32B 15/015* (2013.01); *C22C 1/0425* (2013.01); *C22C 9/00* (2013.01); *C22C 32/0089* (2013.01); *F16C 33/121* (2013.01); *F16C 2204/10* (2013.01)

(58) Field of Classification Search
USPC ........... 428/553; 384/912–913; 420/469–500
See application file for complete search history.

(56) References Cited

U.S. PATENT DOCUMENTS

| 3,607,439 | A | * | 9/1971 | Lilley | ............... 429/166 |
| 5,279,638 | A | | 1/1994 | Asada et al. | |
| 6,165,246 | A | * | 12/2000 | Kira et al. | ............... 75/247 |
| 6,183,886 | B1 | | 2/2001 | Chen et al. | |
| 2005/0265884 | A1 | * | 12/2005 | Shimizu et al. | ............... 419/23 |
| 2006/0091792 | A1 | | 5/2006 | Kugimiya et al. | |
| 2007/0169855 | A1 | * | 7/2007 | Oishi | ............... 148/434 |

(Continued)

FOREIGN PATENT DOCUMENTS

| DE | 571 213 C | 2/1933 |
| DE | 10 97 691 B | 1/1961 |

(Continued)

OTHER PUBLICATIONS

English Translation of JP 2002-309326 from JPO.*

(Continued)

*Primary Examiner* — Humera Sheikh
*Assistant Examiner* — Lucas Wang
(74) *Attorney, Agent, or Firm* — Robert L. Stearns; Dickinson Wright, PLLC

(57) ABSTRACT

CuFe2P is used in a plain bearing or as a plain bearing material. A plain bearing composite material which comprises a supporting layer is provided with a bearing metal layer based on CuFe2P.

17 Claims, 1 Drawing Sheet

(56) References Cited

U.S. PATENT DOCUMENTS

| | | | |
|---|---|---|---|
| 2009/0010797 A1 | 1/2009 | Aruga et al. | |
| 2009/0202861 A1* | 8/2009 | Mihara et al. | 428/670 |
| 2010/0190667 A1* | 7/2010 | Schmitt et al. | 508/108 |

FOREIGN PATENT DOCUMENTS

| | | | | |
|---|---|---|---|---|
| DE | 102007033902 B3 | 7/2007 | | |
| EP | 0962541 A1 | 10/1998 | | |
| JP | 3031437 A | 2/1991 | | |
| JP | 2002-309326 * | 10/2002 | | C22C 9/00 |
| RU | 2023737 C1 | 11/1994 | | |
| SU | 1474177 A1 | 5/1987 | | |
| WO | WO2008/032784 * | 3/2008 | | C22C 9/06 |
| WO | PCT/JP2008/058851 | 5/2008 | | |

OTHER PUBLICATIONS

Amari Copper Alloys, "Alloy CuFe2P", <http://www.amaricopperalloys.com/wp-content/uploads/2013/10/CuFe2P.pdf>, accessed Jun. 22, 2015.*

Olin Brass, "Alloy C194 v. Alloy C122", <http://olinbrass.com/sites/default/files/downloads/Olin-Brass-Fineweld-Tube-Technical-Letter-C194-vs-C122_0.pdf>, accessed Jun. 22, 2015.*

* cited by examiner

PLAIN BEARING MATERIAL

BACKGROUND OF THE INVENTION

1. Technical Field

The present invention relates to a lead-free plain bearing material having a matrix on the basis of CuFe2P. The invention further relates to a plain bearing composite material comprising a steel support layer and a bearing layer made of such a CuFe2P plain bearing material and a sliding member on the basis of CuFe2P.

2. Related Art

Lead-free sintered plain bearing materials on the basis of copper, especially on the basis of a bronze matrix, are well known for favourable heat conductivity and high wear and corrosion resistance when compared to similar materials containing lead. The development of such materials resulted from the desire to replace plain bearing materials containing lead as lead has been classified as a contaminant harmful to the environment. Lead in a plain bearing material has the function of a solid lubricant. Hence a replacement is needed for said solid lubrication. Otherwise, a one-phase bronze material may have increased susceptibility to seizing under mixing friction conditions. Under this aspect, a number of different compositions have been examined both in literature and practical applications and put to use.

For example, EP 0 962 541 A1 describes a copper-based sliding material wherein particles of AlN, $Al_2O_3$, NiB, $Fe_2B$, SiC, TiC, WC, $Si_3N_4$, $Fe_3P$, $Fe_2P$ and/or $Fe_3B$ are dispersed in a matrix of sintered copper or a sintered copper alloy. In order to prepare the sliding material, a copper or copper alloy powder is mixed with, for example, AlN (Hv: 1,300, particle diameter e.g. 0.5 μm) and $Fe_3P$ particles (Hv: 800; particle diameter e.g. 5 μm) and the mixture subjected to sintering. The weight ratio and the average particle diameter of the particles having a mean hardness (Hv) of 500 to 1,000 (i.e. $Fe_3P$, $Fe_2P$ and/or $Fe_3B$) in the mixture and in the sliding material are selected in such a manner that they are larger than the weight ratio and the average particle diameter of the high-hardness (Hv) particles of 1,100 or more (i.e. AlN, $Al_2O_3$, NiB, $Fe_2B$, SiC, TiC, WC and/or $Si_3N_4$).

Another copper-based sliding material is described in WO 2008/140100. It contains 1.0 to 15 wt.-% of Sn, 0.5 to 15 wt.-% of Bi and 0.05 to 5 wt.-% of Ag, Ag and Bi being present in a eutectic state. If necessary, the sliding material may contain 1 to 10 wt.-% of $Fe_3P$, $Fe_2P$, FeB, NiB and/or AlN particles having an average grain diameter of 1.5 to 70 μm.

In contrast to the above, CuFe2P has primarily been used in the electronics industry (e.g. as a contact material) and as a heat exchanger material. US 2009/0010797, for example, describes a plate for electronic components made of a Cu—Fe—P alloy containing 0.01 to 3 wt.-% of Fe and 0.01 to 0.3 wt.-% of P and having a special orientation. CuFe2P is mentioned as a suitable copper alloy. US 2006/0091792 describes sputter targets for flat-screens made of special Cu—Fe—P alloys.

SUMMARY OF THE INVENTION

The present invention is based on the object of providing a plain bearing material which has the advantages of copper-based materials and works without having to use lead. The plain bearing material should have good machinability and prevent seizing of the bearing. Moreover, it is desired that the plain bearing material be produced readily and applied to common supporting layers.

Surprisingly, it has how been found that the use of CuFe2P yields plain bearings having high thermal conductivity and favourable mechanical properties.

Therefore, the present invention relates to the use of CuFe2P for plain bearings or as a plain bearing material. The invention further relates to a plain bearing composite material and a plan bearing comprising said plain bearing material.

DETAILED DESCRIPTION

Figure 1:
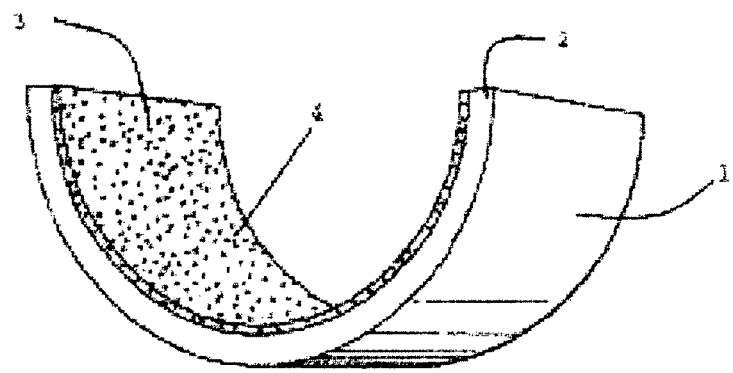
FIG. 1 shows a half-bearing comprising the plain bearing material of the invention.

CuFe2P (CW107C, C19400) is a copper alloy which contains 2.1 to 2.6 wt.-% of Fe, 0.05 to 0.2 wt.-% of Zn, 0.015 to 0.15 wt.-% of P, up to 0.03 wt-% of Pb and up to 0.2% of other ingredients according to the DIN EN specification. An alloy suitable for the purposes of the present invention is available under the designation Wieland-K65® and has the following composition (approximate values):

|    | Weight % |
|----|----------|
| Fe | 2.4      |
| Zn | 0.12     |
| P  | 0.03     |
| Cu | Balance  |

The specific thermal capacity of CuFe2P is:

| Temperature [° C.] | Specific thermal capacity [J/g · L)] |
|--------------------|--------------------------------------|
| 20                 | 0.38                                 |
| 100                | 0.38                                 |
| 200                | 0.39                                 |
| 300                | 0.41                                 |

(See information on CuFe2P from Deutsche Kupferinstitut)

According to the invention, CuFe2P is used as a plain bearing material.

When preparing the plain bearing material of the invention, CuFe2P is preferably sintered or cast. Sintering is preferably performed at a temperature of 950 to 980° C.

During the preparation of the plain bearing material of the invention from CuFe2P by sintering and/or casting, hard $Fe_2P$ particles are formed which are present in the matrix. Contrary to the teaching of EP 0 962 541 A1, these need not be incorporated by specific steps. These hard particles lead to high abrasion resistance. They are also useful as chip breakers which helps improve the machinability of the material, for example when drilling the bearing. The existing $Fe_2P$ particles yield favourable polishing characteristics vis-à-vis the element moving in the opposite direction, thus preventing seizing of the plain bearing and the possible transfer of bearing material to the element moving in the opposite direction and the associated adherence of the bearing to said element.

Another advantage of the plain bearing material of the invention is its high heat conductivity, which, for example, is twice as high as in cast CuNi2Si which is frequently used in plain bearings. When compared to common sinter materials such as CuSn8Ni, CuSn10Bi3.5 and CuPb23Sn3, heat conductivity is even higher by a factor of up to and including 5. This results in favourable discharge of the heat generated in the bearing and hence a smaller likelihood of overheating with resulting damages to the bearing material under mixing friction conditions. The favourable discharge of the heat generated in the bearing also avoids thermal influences on the oil present in the bearing which may result in a change of viscosity and the lubricating behaviour.

Due to the interaction of high thermal conductivity and the polishing action of the $Fe_2P$ hard particles, seizing of the bearing can be prevented especially effectively, since both effects reduce adhesion of the plain bearing material to the element moving in the opposite direction. This effect may be enhanced in a preferred embodiment of the invention by incorporating additional hard particles.

Examples of suitable hard particles include particles of AlN, $Al_2O_3$, NiB, $Fe_2B$, SiC, TiC, WC, $W_2C$, $Mo_2C$, c-Bn, $MoSi_2$, $Si_3N_4$, $Fe_3P$, $Fe_2P$, $Fe_3B$, $TiO_2$ and $ZrO_2$.

In another preferred embodiment, the plain bearing material of the invention further contains a solid lubricant such as h-BN or graphite. The addition of such a solid lubricant reduces the coefficient of friction and hence the generation of heat in the bearing. If h-BN is used as the solid lubricant, the particles described in DE 10 2007 033 902 B3 the disclosure of which is incorporated by reference may be used, for example.

Figure 2:
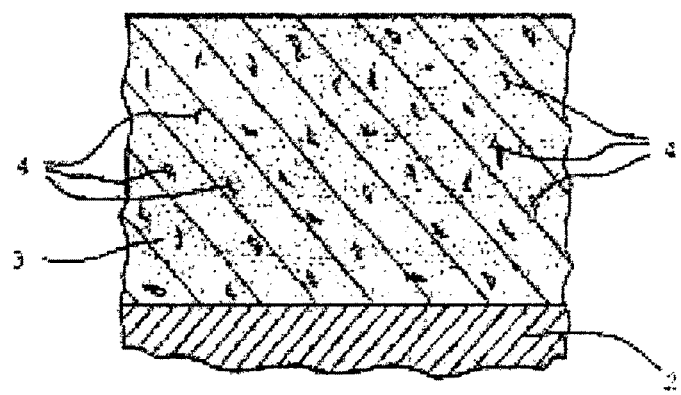
FIG. 2 shows a magnified cut of the half-bearing of FIG. 1.

The invention further relates to a plain bearing composite material. FIGS. 1 and 2 show a half bearing (1) made of the plain bearing composite material of the invention which comprises a supporting layer (2), preferably made of steel, and the above mentioned plain bearing material (3) on a CuFe2P basis comprising the $Fe_2P$ particles (4) formed therein as the metal layer of the bearing. The thickness of the metal layer of the bearing is preferably 0.1 to 1.0 mm, especially preferably 0.3 to 0.5 mm.

It is preferred that a sliding layer having a thickness of 7 to 20 μm is arranged on the metal layer of the bearing made of the above plain bearing material. It is especially preferred to arrange a running-in layer having a thickness to 1 to 10 μm on the sliding layer. Such sliding layers and running-in layers are well known to a person skilled in the art and are commonly used in plain bearings.

In another aspect, the present invention also relates to a plain bearing comprising said plain bearing composite material.

EXAMPLES

Example 1

For preparing the plain bearing material, a CuFe2P powder is applied to a steel supporting layer and sintered at 950 to 980° C. in a first step. Then the material is compacted by a rolling step so that a porosity value below 0.5% is obtained. For healing the sinter layer, sintering is repeated at 950 to 980° C. and the layer hardness adjusted to 90 to 150 HBW 1/5/30 and the porosity to a value below 0.3% by means of a second rolling step.

Example 2

For preparing the plain bearing materials, CuFe2P is heated above its melting point of 1089° C. and melted. The melt is then cast onto a steel supporting layer at a temperature of 1150 to 1250° C.

The surface of the layer may then be smoothed by mechanical machining in a manner known to a person skilled in the art and, optionally, the desired hardness adjusted by one or more rolling step(s).

The invention claimed is:

1. A plain bearing composite material comprising:
a supporting layer made of steel, a bearing metal layer disposed on the supporting layer,
the bearing metal layer including a copper-based matrix consisting of a CuFe2P copper alloy, the CuFe2P copper alloy consisting of 2.1 to 2.6 wt.-% of Fe, 0.05 to 0.2 wt.-% of Zn, 0.015 to 0.15 wt.-% of P, up to 0.03 wt.-% of Pb and up to 0.2 wt. % of other ingredients,
the bearing metal layer including $Fe_2P$ particles surrounded by the copper-based matrix.

2. The plain bearing composite material of claim 1, wherein the bearing metal layer is a cast material.

3. The plain bearing composite material of claim 1, wherein the bearing metal layer is a sintered material.

4. The plain bearing composite material of claim 1, wherein the bearing metal layer includes additional hard particles surrounded by the copper-based matrix.

5. The plain bearing composite material of claim 4 wherein the additional hard particles include at least one selected from the group consisting of: AlN, $Al_2O_3$, NiB, $Fe_2B$, SiC, TiC, WC, $W_2C$, $Mo_2C$, c-Bn, $MoSi_2$, $Si_3N_4$, $Fe_3P$, $Fe_2P$, $Fe_3B$, $TiO_2$ and $ZrO_2$.

6. The plain bearing composite material of claim 1, wherein the bearing metal layer includes a solid lubricant surrounded by the copper-based matrix.

7. The plain bearing composite material of claim 6 wherein the solid lubricant is h-BN or graphite.

8. The plain bearing composite material of claim 1, wherein the bearing metal layer has a hardness of 90 to 150 HBW and a porosity below 0.3%.

9. A method of manufacturing the plain bearing composite material of claim 1 including the step of: casting and/or sintering the CuFe2P copper alloy, wherein the $Fe_2P$ particles are formed from the CuFe2P copper alloy during the casting and/or sintering step.

10. The method of claim 9, wherein the plain bearing composite material is sintered at a temperature of 950 to 980° C.

11. A plain bearing comprising:
a supporting layer made of steel,
a bearing metal layer disposed on the supporting layer,
the bearing metal layer including a copper-based matrix consisting of a CuFe2P copper alloy, the CuFe2P copper alloy consisting of 2.1 to 2.6 wt.-% of Fe, 0.05 to 0.2 wt.-% of Zn, 0.015 to 0.15 wt.-% of P, up to 0.03 wt.-% of Pb and up to 0.2 wt. % of other ingredients,
the bearing metal layer including $Fe_2P$ particles surrounded by the copper-based matrix, and
a running-in layer disposed on the bearing metal layer.

12. The plain bearing of claim 11 wherein the bearing metal layer includes additional hard particles surrounded by the copper-based matrix.

13. The plain bearing of claim 12 wherein the additional hard particles of the bearing metal layer include at least one selected from the group consisting of: AlN, $Al_2O_3$, NiB, $Fe_2B$, SiC, TiC, WC, $W_2C$, $Mo_2C$, c-Bn, $MoSi_2$, $Si_3N_4$, $Fe_3P$, $Fe_2P$, $Fe_3B$, $TiO_2$ and $ZrO_2$.

14. The plain bearing of claim 11 wherein the bearing metal layer includes a solid lubricant surrounded by the copper-based matrix.

15. The plain bearing of claim 14 wherein the solid lubricant of the bearing metal layer includes at least one of h-BN and graphite.

16. The plain bearing of claim 11, wherein the bearing metal layer has a hardness of 90 to 150 HBW and a porosity below 0.3%.

17. A method of manufacturing the plain bearing of claim 11 including the step of: casting and/or sintering the CuFe2P copper alloy, wherein the $Fe_2P$ particles are formed from the CuFe2P copper alloy during the casting and/or sintering step.

* * * * *